United States Patent
Mori et al.

(10) Patent No.: US 6,949,225 B1
(45) Date of Patent: Sep. 27, 2005

(54) METHOD AND APPARATUS FOR TREATING A WASTE GAS CONTAINING FLUORINE-CONTAINING COMPOUNDS

(75) Inventors: Yoichi Mori, Kanagawa-ken (JP); Takashi Kyotani, Kanagawa-ken (JP); Toyoji Shinohara, Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/714,220

(22) Filed: Nov. 17, 2000

(30) Foreign Application Priority Data

Nov. 18, 1999   (JP)   ............................. 11-328411

(51) Int. Cl.$^7$ ............................................. B01D 53/70

(52) U.S. Cl. .................... 422/173; 422/171; 422/177

(58) Field of Search ................................ 422/168–174, 422/177

(56) References Cited

U.S. PATENT DOCUMENTS

| | | | | |
|---|---|---|---|---|
| 5,649,985 A | * | 7/1997 | Imamura | 422/174 |
| 5,955,037 A | | 9/1999 | Holst et al. | 422/171 |
| 6,126,906 A | * | 10/2000 | Imamura | 422/170 |
| 2001/0001652 A1 | * | 5/2001 | Kanno et al. | 423/240 S |

FOREIGN PATENT DOCUMENTS

| | | |
|---|---|---|
| DE | 43-19-118 A1 | 12/1994 |
| EP | 0-885-648 A1 | 12/1998 |
| EP | 0-916-388 A2 | 5/1999 |
| JP | 10-286434 | 10/1998 |
| WO | 00/09258 | 2/2000 |

OTHER PUBLICATIONS

Dr. Hiroshi Shimizu, "Handbook of Adsorption Technique", Feb. 2, 1993, pp. 792-795.

* cited by examiner

*Primary Examiner*—Hien Tran
(74) *Attorney, Agent, or Firm*—Wenderoth, Lind & Ponack, L.L.P.

(57) ABSTRACT

An apparatus for treatment of a waste gas, containing fluorine-containing compounds, comprises: a solids treating device for separating solids from the waste gas; an addition device for adding $H_2$ and/or $H_2O$, or $H_2$ and/or $H_2O$ and $O_2$, as a decomposition assist gas to the waste gas leaving the solids treating device; a thermal decomposition device that is packed with γ-alumina heated at 600–900° C., and which thermally decomposes the waste gas to which the decomposition assist gas has been added; an acidic gas treating device for removing acidic gases from the thermally decomposed waste gas; and channels or lines for connecting these devices in sequence. The apparatus preferably includes an air ejector which is capable of adjusting an internal pressure of the apparatus.

4 Claims, 1 Drawing Sheet

METHOD AND APPARATUS FOR TREATING A WASTE GAS CONTAINING FLUORINE-CONTAINING COMPOUNDS

BACKGROUND OF THE INVENTION

This invention relates to treatment of a waste gas containing fluorine-containing compounds. More particularly, it relates to a method and an apparatus for efficient treatment of emissions from semiconductor fabrication plants, particularly from steps of dry cleaning an inner surface of a fabrication apparatus and etching various kinds of deposited films with perfluorocarbons (PFCs) and halogenated hydrocarbons such as $C_2F_6$, $C_3F_8$, $CHF_3$, $SF_6$ and $NF_3$. The waste gases contain not only PFCs but also oxidizing gases such as $F_2$, $Cl_2$ and $Br_2$, acidic gases such as HF, HCl, HBr, $SiF_4$, $SiCl_4$, $SiBr_4$ and $COF_2$, as well as CO.

Semiconductor fabrication plants use many kinds of harmful gases that can potentially pollute the environment. PFCs contained in waste gases that typically result from etching and CVD steps are suspected of causing global warming, and it is urgently needed to establish an effective system for their removal.

Various breaking and recovery techniques have heretofore been proposed for PFC removal. Catalytic thermal decomposition is one of the breaking techniques and uses versatile compounds such as Pt catalyst, zeolite-based catalysts, activated charcoal, activated alumina, alkali metals, alkaline earth metals and metal oxides. However, none of these catalytic compounds have proved completely satisfactory.

Waste gases discharged from a semiconductor fabrication process contain not only PFCs, but also oxidizing gases such as $F_2$, $Cl_2$ and $Br_2$, acidic gases such as HF, HCl, HBr, $SiF_4$, $SiCl_4$, $SiBr_4$ and $COF_2$, as well as CO; however, no method has yet been established that can realize a thorough and effective treatment of these harmful gases.

If one wants to treat oxidizing gases such as $F_2$, $Cl_2$ and $Br_2$ by a wet method, thorough treatment cannot be achieved by use of water alone. If alkali agents or reducing agents are also used, not only process control but also a treatment apparatus becomes complicated and, in addition, cost of treatment increases.

To remove CO, it has to be decomposed with oxidizers such as those based on Cu or Mn. As for PFCs, it has been proposed to use alumina as an agent for removing them (Japanese Patent Public Disclosure No. 286434/1998), and this method is characterized by contacting $C_2F_6$ with molecular oxygen. However, the lifetime of alumina is very short and throughput or an amount of $C_2F_6$ that can be treated for 100% decomposition is only 4.8 L/L. Additionally, no effective way has been proposed to deal with CO that occurs as a by-product of $C_2F_6$ decomposition, and oxidizing gases and acidic gases that occur concomitantly with PFCs.

SUMMARY OF THE INVENTION

The present invention has been accomplished under these circumstances and has as an object providing a method for treating waste gases containing fluorine-containing compounds, which method achieves high percent decomposition of PFCs. The method proves to be effective for a prolonged time and simultaneously realizes effective removal of oxidizing gases, acidic gases and CO that are contained in the waste gases.

Another object of the invention is to provide an apparatus for implementing this method.

A first object of the invention can be attained by a method for treatment of a waste gas containing fluorine-containing compounds, which method comprises: separating solids from the waste gas; adding $H_2$ and/or $H_2O$, or $H_2$ and/or $H_2O$ and $O_2$, as a decomposition assist gas; thermally decomposing the waste gas by contact with γ-alumina usually at 500–1000° C., preferably at 600–900° C., and more preferably at 700–900° C.; and removing acidic gases from the decomposed waste gas.

In this method, the waste gas containing fluorine-containing compounds may be a waste gas from a semiconductor fabrication process that contains not only perfluorocarbons and fluorinated hydrocarbons but also oxidizing gases, acidic gases and CO.

A second object of the invention can be attained by an apparatus for treatment of a waste gas containing fluorine-containing compounds, which apparatus comprises a solids treating device for separating solids from a waste gas containing fluorine-containing compounds; an addition device for adding $H_2$ and/or $H_2O$, or $H_2$ and/or $H_2O$ and $O_2$, as a decomposition assist gas to the waste gas leaving the solids treating device; a thermal decomposition device that is packed with γ-alumina heated at 600–900° C., and which thermally decomposes the waste gas to which the decomposition assist gas has been added; an acidic gas treating device for removing acidic gases from the thermally decomposed waste gas; and channels or lines for connecting these device in sequence.

In this treatment apparatus, a water scrubber may be used as the solids treating device or the acidic gas treating device. This treatment apparatus may have not only an air ejector capable of adjusting pressure in the apparatus through which the waste gas passes, but also an FT-IR analyzer for controlling emission density of treated gas.

A first step in the method of the invention for treating a waste gas containing fluorine-containing compounds is passing the waste gas through a solids treating device such as a water scrubber. Exit gas is passed through a thermal decomposition device packed with γ-alumina heated at 500–1000° C., preferably 600–900° C., and more preferably 700–900° C., with $H_2$ and/or $H_2O$, or $H_2$ and/or $H_2O$ and $O_2$, being added as a decomposition assist gas, so that PFCs, oxidizing gases and CO are completely decomposed into acidic gases and $CO_2$. Generated acidic gases are removed with an acidic gas treating device such as a water scrubber.

The method may also employ not only an air ejector capable of adjusting pressure in the apparatus through which the waste gas passes, but also an FT-IR analyzer for controlling emission density of treated gas.

DETAILED DESCRIPTION OF THE INVENTION

Figure 1:
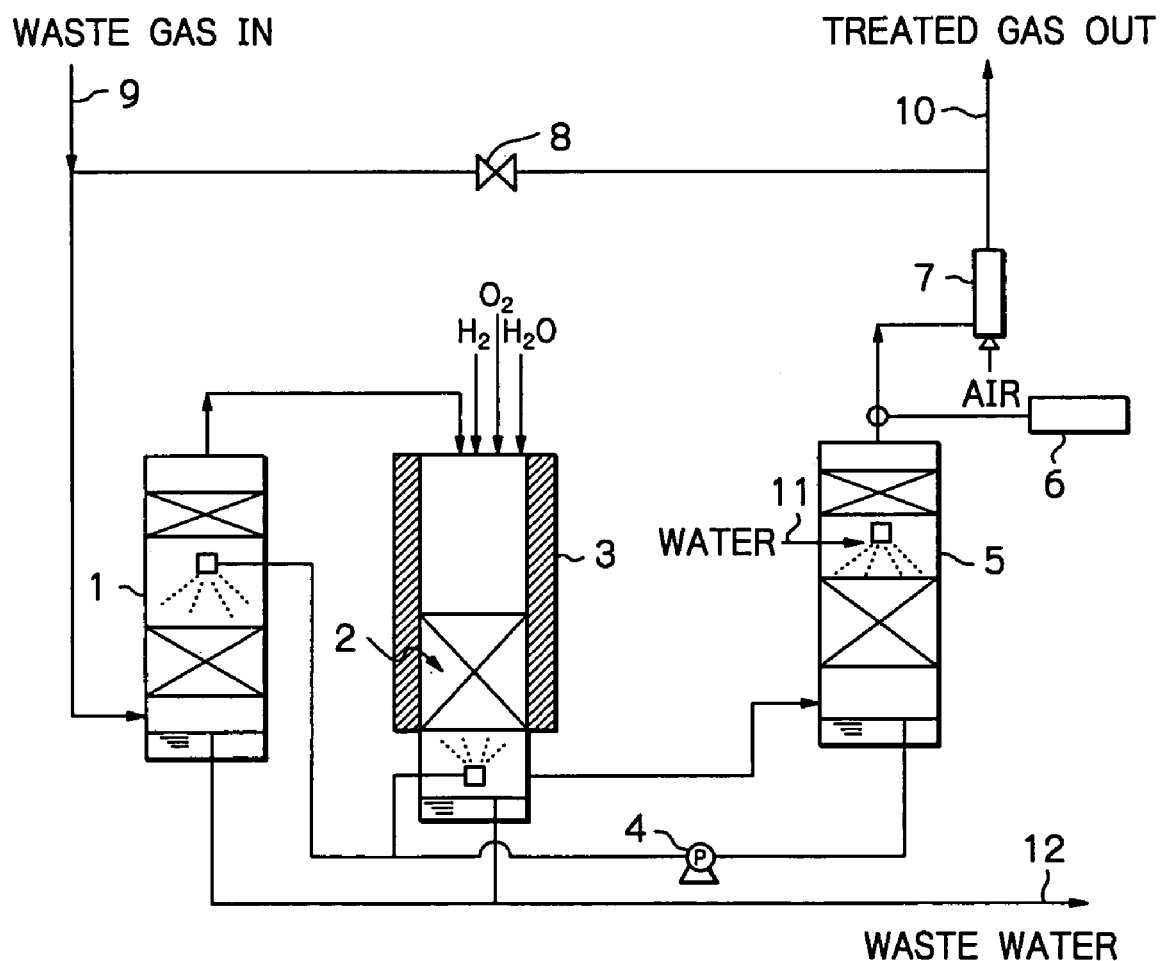
FIG. 1 is a flowchart for a waste gas treatment apparatus of the invention.

The present invention is described below in detail. In a first step, a waste gas containing PFCs, oxidizing gases, acidic gases and CO is passed through a solids treating device such as a water scrubber in order to remove not only solids such as $SiO_2$ in the waste gas but also Si compounds such as $SiF_4$, $SiCl_4$ and $SiBr_4$ that may potentially solidify in a thermal decomposition device of a next stage. If the waste gas is directly introduced into the thermal decomposition device without being passed through the solids treating device, clogging or other blocking problems will occur, thereby potentially preventing the waste gas from smoothly flowing through a packed γ-alumina layer. Performance of γ-alumina may also deteriorate. By passing the waste gas through the solids treating device, solids and acidic gases containing Si compounds are removed, whereas part of oxidizing gases such as $F_2$, $Cl_2$ and $Br_2$ as well as all volumes of PFCs and CO are discharged.

The waste gas emerging from the solids treating device is then introduced into the thermal decomposition device so that the waste gas is decomposed through contact with γ-alumina heated at 500–1000° C., preferably 600–900° C., more preferably 700–900° C. On this occasion, $H_2$ and/or $H_2O$; or $H_2$ and/or $H_2O$ and $O_2$ are added to the waste gas as a decomposition assist gas so that components of the waste gas are decomposed into acidic gases and $CO_2$ according to the following reaction schemes:

$$CF_4 + 2H_2 + O_2 \rightarrow CO_2 + 4HF$$

$$CF_4 + 2H_2O \rightarrow CO_2 + 4HF$$

$$F_2 + H_2 \rightarrow 2HF$$

$$2F_2 + 2H_2O \rightarrow 4HF + O_2$$

$$2CO + O_2 \rightarrow 2CO_2$$

Thus, PFC reacts with $H_2$ and $O_2$ or $H_2O$ to be decomposed into $CO_2$ and HF. Acidic gases such as $F_2$ react with $H_2$ or $H_2O$ to be decomposed to another acidic gas HF. Carbon monoxide (CO) is oxidized to $CO_2$.

As for PFC, $H_2$ or $H_2O$ is added in moles at least equal to the moles necessary for F atoms in the PFC to be converted into HF, and $O_2$ is added in moles at least equal to the moles necessary for C atoms in the PFC to be converted into $CO_2$. Preferably, $O_2$ is added in moles which are at least equal to the sum of one mole and the above-defined minimum number of moles. As for oxidizing gases, $H_2$ is introduced in moles at least equal to the moles necessary for halogen atoms (X) in an oxidizing gas to be converted into an acidic gas (HX).

The waste gas leaving the thermal decomposition device only contains acidic gases (HX) and $CO_2$, and by subsequent treatment with an acidic gas treating device such as a water scrubber, these acidic gases are completely removed.

Alumina to be used in the invention may have a γ-crystalline structure without a uniform pore distribution. While the shape of the alumina is not limited in any particular way, spheres are easy to handle and, hence, preferred. To an extent that will not unduly increase resistance to the passage of the waste gas, a particle size of γ-alumina should be as small as possible, preferably between 0.8 mm and 2.6 mm. The γ-alumina may be held at between 500° C. and 1000° C., preferably 600° C. and 900° C. and more preferably 700° C. and 900° C. during the passage of the waste gas.

The solids treating device and the acidic gas treating device are preferably a packed column or a spray column, on condition that they are adapted to spray water. The thermal decomposition device should be adapted to permit introduction of $H_2$ and/or $H_2O$, or $H_2$ and/or $H_2O$ and $O_2$, as a decomposition assist gas.

FIG. 1 is a flowchart for a waste gas treatment apparatus of the invention. The apparatus generally comprises a solids treating device 1, an γ-alumina packed layer 2, a thermal decomposition device 3, a cleaning water circulating pump 4, an acidic gas treating device 5, a Fourier Transform Infrared Spectroscopy analyzer 6 (hereinafter referred to as an FT-IR analyzer), an air ejector 7 and a bypass valve 8.

A waste gas 9 containing PFCs, oxidizing gases, acidic gases and CO is first passed through a spray column (solids treating device) 1 so as to remove solids and Si compounds. The waste gas is then passed through the thermal decomposition device 3, which is also supplied with $H_2$, $O_2$ and $H_2O$ to decompose the PFCs, oxidizing gases and CO into acidic gases and $CO_2$. The acidic gases are removed by passage through a subsequent spray column (acidic gas treating device) 5, from which treated gas 10 emerges.

The air ejector 7 is installed to control pressure in each of the treating devices 1, 3 and 5, and the FT-IR analyzer 6 is provided to monitor the treated gas.

Spray water 11 is introduced into the acidic gas treating device 5, and spent water is forced to the solids treating device 1 via the cleaning water circulating pump 4. This water is used for spraying in the solids treating device 1, and is then discharged as wastewater 12.

The following examples are provided for the purpose of further illustrating the present invention but are in no way to be taken as limiting.

EXAMPLE 1

An experiment was conducted using a quartz column of 25 mm$^\phi$, which was packed with γ-alumina to a height of 100 mm. The γ-alumina was a commercial product of Mizusawa Kagaku K.K. (NEOBEAD GB-08) having a particle size of 0.8 mm. The quartz column was installed in a ceramic electric furnace and the γ-alumina was heated at 800° C.

In addition to $CF_4$ diluted with $N_2$ gas, $H_2$ and $O_2$ were supplied as decomposition assist gases, with the amount of $H_2$ being such that the number of H atoms was at least equal to the number of F atoms in $CF_4$, and the amount of $O_2$ being at least equimolar to the amount of $H_2$ supplied. These gases were flowed into the column at a total rate of 408 sccm and their entrance concentrations were 1.0% ($CF_4$), 3.0% ($H_2$) and 5.7% ($O_2$).

In order to evaluate performance of the treatment system, exit gas was analyzed periodically and passage of the $CF_4$ gas was stopped when removal of $CF_4$ dropped below 98%. Throughput was determined from the amount of $CF_4$ that had been passed through the system. The analysis of $CF_4$ and other gases was conducted with a gas chromatographic apparatus equipped with a mass detector.

As it turned out, the removal of $CF_4$ dropped to 98% when its passage continued for 920 min. At this point in time, the throughput as determined from the quantity of the supplied $CF_4$ was 77 L/L. Throughout the experiment, concentration of CO emission was below a tolerable level (25 ppm).

COMPARATIVE EXAMPLE 1

An experiment was conducted using the same equipment as in Example 1, which was packed with the same γ-alumina in the same amount and heated to the same temperature as that of Example 1. Total gas flow rate was 408 sccm; feed gas was a mixture of $N_2$-diluted $CF_4$ and $SiF_4$; in addition, $H_2$ and $O_2$ were supplied as decomposition assist gases, with the amount of $H_2$ being such that the number of H atoms was at least equal to the total number of F atoms in $CF_4$ and $SiF_4$, and the amount of $O_2$ being at least equimolar to the amount of $H_2$ supplied. These gases were flowed into the column at respective concentrations of 0.95% ($CF_4$), 0.97% ($SiF_4$), 5.3% ($H_2$) and 6.0% ($O_2$).

As it turned out, removal of $CF_4$ dropped below 98% when passage of the $CF_4/SiF_4$ gas continued for 510 minutes. At this point in time, throughput was 40 L/L, which was nearly one half the throughput for the case where only $CF_4$ gas was supplied. Throughout the experiment, concentration of CO was below a tolerable level.

EXAMPLE 2

An experiment was conducted using the same equipment as in Example 1, which was packed with the same γ-alumina in the same amount and heated to the same temperature as that of Example 1. Total gas flow rate was 408 sccm; feed gas was a mixture of $N_2$-diluted $CF_4$ and $F_2$; in addition, $H_2$ and $O_2$ were supplied as decomposition assist gases, with the amount of $H_2$ being such that the number of H atoms was at least equal to the total number of F atoms in $CF_4$ and $F_2$, and the amount of $O_2$ being at least equimolar to the amount of $H_2$ supplied. These gases were flowed into the column at respective concentrations of 0.92% ($CF_4$), 1.1% ($F_2$), 5.0% ($H_2$) and 6.0% ($O_2$).

As it turned out, the removal of $CF_4$ dropped below 98% when passage of the $CF_4/F_2$ gas continued for 25 hours. At this point in time, throughput was 115 L/L, which was 1.51 times higher than the throughput for the case where only $CF_4$ gas was supplied. Throughout the experiment, concentrations of CO and $F_2$ were below tolerable levels (1 ppm for $F_2$), provided that $F_2$ had been decomposed into HF.

REFERENCE EXAMPLE 1

An experiment was conducted using the same equipment as in Example 1, which was packed with the same γ-alumina in the same amount and heated to the same temperature as that of Example 1. The total gas flow rate was 408 sccm; in addition to $N_2$-diluted CO, $O_2$ was supplied in moles at least equal to the moles necessary for CO to be converted into $CO_2$, and their respective entrance concentrations were 1.4% (CO) and 5.7% ($O_2$). Throughout passage of a feed gas for 30 minutes, concentration of CO was below the detection limit (2 ppm), and all of CO had been oxidized into $CO_2$.

COMPARATIVE EXAMPLE 2

An experiment was conducted using the same equipment as in Example 1, which was packed with the same γ-alumina in the same amount and heated to the same temperature as that of Example 1. Total gas flow rate was 408 sccm. In addition to $N_2$-diluted CO, $H_2O$ was supplied at a rate of 0.090 mL/min, which was 22 times as much as CO, and an entrance concentration of CO was 1.3%.

As it turned out, 1000 ppm of CO leaked as a result of a 15 minute passage of a feed gas. Obviously, concentration of CO could not be reduced to below a tolerable level (25 ppm) by the sole addition of $H_2O$.

REFERENCE EXAMPLE 2

An experiment was conducted using the same equipment as in Example 1, which was packed with the same γ-alumina in the same amount and heated to the same temperature as that of Example 1. Total gas flow rate was 408 sccm. In addition to $N_2$-diluted CO, $H_2O$ was supplied at a rate of 0.090 mL/min, which was 18 times as much as CO, and $O_2$ was supplied in moles at least equal to the moles necessary for CO to be converted into $CO_2$. Entrance concentrations of CO and $O_2$ were 1.5% and 3.4%, respectively.

As it turned out, concentration of CO had been reduced to below a detection limit (2 ppm) after passage of a feed gas for 3 hours. Obviously, CO was oxidized to $CO_2$ by addition of $O_2$.

EXAMPLE 3

An experiment was conducted using the same equipment as in Example 1, which was packed with the same γ-alumina in the same amount as that of Example 1 and heated to 700° C. Total gas flow rate was 408 sccm. In addition to $N_2$-diluted $CF_4$, $H_2O$ was supplied at a rate of 0.040 mL/min, which was 14 times as much as $CF_4$, and $O_2$ was supplied in moles at least equal to the moles necessary for the C atom in $CF_4$ to be converted into $CO_2$. Entrance concentrations of $CF_4$ and $O_2$ were 0.89% and 3.0%, respectively.

As it turned out, removal of $CF_4$ dropped below 98% when passage of a feed gas continued for 23 hours. At this point in time, throughput was 110 L/L, which was 1.4 times higher than the throughput of $CF_4$ treatment in the presence of added $H_2$ and $O_2$. Throughout the experiment, the concentration of CO was below a tolerable level.

COMPARATIVE EXAMPLE 3

In order to evaluate effectiveness of a wet process in treating oxidizing gases and acidic gases, a water cleaning column (210 mm$^\Phi$×430 mm$^H$ with a Raschig ring packed to a height of 170 mm) was supplied with a waste gas at a total rate of 60 L/min, and with spray water at a rate of 3.5 L/min. The waste gas was prepared from $F_2$, $SiF_4$ and $Cl_2$, which had entrance concentrations of 1100 ppm, 1600 ppm and 5100 ppm, respectively. At an exit of the column, $F_2$, $SiF_4$ and $Cl_2$ were detected at concentrations of 11 ppm, <1 ppm, and 3300 ppm, respectively. Obviously, $SiF_4$ was effectively treated but $F_2$ and $Cl_2$ leaked out.

EXAMPLE 4

A water cleaning column (210 mm$^\Phi$×430 mm$^H$ with a Raschig ring packed to a height of 170 mm) was used as a solids treating device. This column was combined with a thermal decomposition device comprising a preheating chamber and a catalyst packed chamber, and an acidic gas treating device which was the same as the water cleaning column. Exit gas leaving the acidic gas treating device was monitored with an FT-IR analyzer (Infinity 6000 of MATTSON), and pressure in the experimental system was controlled with an air ejector of Daito Seisakusho K.K. The solids treating device and the acidic gas treating device were supplied with cleaning water at respective flow rates of 2 L/min and 4 L/min. The thermal decomposition device was supplied with air and pure water at respective flow rates of 10 L/min and 2.4 mL/min. A catalyst was 15 L of γ-alumina (NEOBEAD GB-08 of Misusawa Kagaku K.K.)

A gas dryer (MD-70-72P of PERMAPUR) was installed ahead of the FT-IR analyzer for removing moisture in the waste gas. Air was supplied into an air ejector at a rate of 30 L/min so that pressure in the system was kept at a negative value of –0.5 kPa. A waste gas was introduced at a flow rate of 60 L/min, and it was prepared from a $N_2$ base containing $CF_4$, $SiF_4$, $F_2$ and CO at respective concentrations of 0.5%, 0.3%, 0.3% and 0.3%. The waste gas was first passed through the solids treating device, then passed through the thermal d composition device in the presence of added water and $O_2$, with the catalyst being heated at 700° C. The waste gas was subsequently passed through the acidic gas treating device, and treated gas was continuously analyzed by FT-IR. After passage of the waste gas for 10 hours, $CO_2$, was detected in an amount of 6900 ppm, but each of $CF_4$, $SiF_4$, HF and CO had been treated to below 1 ppm. No $F_2$ was detected by ion chromatographic analysis.

EXAMPLE 5

A waste gas treatment was conducted with the same experimental setup under the same conditions as in Example 4, except that $CF_4$ was replaced by $C_2F_6$, and that waste gas was prepared from a $N_2$ base containing $C_2F_6$, $SiF_4$, $F_2$ and CO at respective concentrations of 0.5%, 0.3%, 0.3% and 0.3%. The waste gas was passed through the solids treating device, the thermal decomposition device and the acidic gas treating device.

Treated gas emerging from the acidic gas treating device was continuously analyzed by FT-IR. After the passage of the waste gas for 10 hours, $CO_2$ was detected in an amount of 11000 ppm, but each of $C_2F_6$, $SiF_4$, HF and CO had been treated to below 1 ppm. No $F_2$ was detected by ion chromatographic analysis.

According to the invention, harmful waste gases, from a semiconductor fabrication process, that contain PFCs, oxidizing gases, acidic gases and CO, and which are a potential accelerator of global warming, can be treated in such a way that high percent decomposition is maintained for a prolonged time.

What is claimed is:

1. An apparatus for treating a waste gas containing fluorine-containing compounds from a semiconductor fabrication process, comprising:
   a solids treating device for removing solids and acidic gases including Si compounds from a waste gas containing fluorine-containing compounds;
   an addition device for adding $H_2$ and/or $H_2O$ and $O_2$ as a decomposition assist gas to the waste gas discharged from said solids treating device;
   a thermal decomposition device for decomposing into acidic gases and $CO_2$ perfluorocarbons, oxidizing gases and CO discharged from said solids treating device and to which the decomposition assist gas has been added, said thermal decomposition device comprising a preheating chamber and a catalyst chamber packed with γ-alumina to be heated to 500° C. to 1000° C.;
   an acidic gas treating device for removing acidic gases discharged from said thermal decomposition device;
   a supply line for supplying the waste gas into said solid treating device;
   a first line interconnecting said solids treating device and said thermal decomposition device, and a second line interconnecting said thermal decomposition device and said acidic gas treating device;
   a discharge line for discharging treated gas from said acidic gas treating device;
   a bypass interconnecting said supply line and said discharge line, said bypass having a bypass valve such that upon actuation of said bypass valve the waste gas is conveyed from said supply line to said discharge line without entering said solids treating device;
   an air ejector, positioned in said discharge line, for maintaining a negative pressure in each of said solids treating device, said thermal decomposition device, said acidic gas treating device and said first and second lines; and
   an analyzer, positioned immediately upstream of said air ejector, for controlling emission density of the treated gas discharged from said acidic gas treating device.

2. The apparatus according to claim 1, wherein at least one of said solids treating device and said acidic gas treating device comprises a water scrubber.

3. The apparatus according to claim 1, wherein said analyzer comprises an FT-IR analyzer.

4. The apparatus according to claim 3, wherein said FT-IR analyzer is for monitoring the treated gas discharged from said acidic gas treating device so as to control emission density of the treated gas.

* * * * *